US007324967B1

(12) United States Patent
Sankaran et al.

(10) Patent No.: US 7,324,967 B1
(45) Date of Patent: Jan. 29, 2008

(54) METHOD AND SYSTEM FOR INTERACTIVE INITIAL OFFERING OF MULTI-CLASS FINANCIAL INSTRUMENTS

(76) Inventors: Srikanth Sankaran, 1453 Scott Ave., Winnetka, IL (US) 60093; Douglas T. Chorna, 4794 Valencia Dr., Delray Beach, FL (US) 33445

( * ) Notice: Subject to any disclaimer, the term of this patent is extended or adjusted under 35 U.S.C. 154(b) by 0 days.

(21) Appl. No.: 09/501,154

(22) Filed: Feb. 9, 2000

(51) Int. Cl.
*G06Q 30/00* (2006.01)

(52) U.S. Cl. .......................... 705/35; 705/35; 705/36; 705/37; 705/38

(58) Field of Classification Search ................ 705/26, 705/27, 37, 38, 22, 28, 35, 36
See application file for complete search history.

(56) References Cited

U.S. PATENT DOCUMENTS

| | | | | |
|---|---|---|---|---|
| 5,765,143 | A * | 6/1998 | Sheldon et al. | 705/28 |
| 5,950,177 | A * | 9/1999 | Lupien et al. | 705/37 |
| 6,070,151 | A * | 5/2000 | Frankel | 705/36 R |
| 6,092,056 | A * | 7/2000 | Tull et al. | 705/36 R |
| 6,101,484 | A * | 8/2000 | Halbert et al. | 705/26 |
| 6,167,386 | A * | 12/2000 | Brown | 705/37 |
| 6,202,051 | B1 * | 3/2001 | Woolston | 705/37 |
| 6,233,566 | B1 * | 5/2001 | Levine et al. | 705/36 R |
| 6,236,972 | B1 * | 5/2001 | Shkedy | 705/1 |
| 6,260,024 | B1 * | 7/2001 | Shkedy | 705/37 |
| 6,266,652 | B1 * | 7/2001 | Godin et al. | 705/37 |
| 6,269,343 | B1 * | 7/2001 | Pallakoff | 705/26 |
| 6,341,271 | B1 * | 1/2002 | Salvo et al. | 705/28 |
| 6,366,890 | B1 * | 4/2002 | Usrey | 705/10 |
| 6,470,324 | B1 * | 10/2002 | Brown et al. | 705/28 |
| 6,571,219 | B1 * | 5/2003 | Spivey | 705/36 R |
| 6,598,026 | B1 * | 7/2003 | Ojha et al. | 705/26 |
| 6,629,082 | B1 * | 9/2003 | Hambrecht et al. | 705/37 |

OTHER PUBLICATIONS

Parks, "The ABC of CMOs, REMICs, and IO/POs: Rocket Science Comes to Mortgage Finance", Journal of Accountancy, v171n4, pp. 41-51, Apr. 1991.*
Holdcroft et al. "The Wizards of Wall Street", Secondary Mortage Markets, v5n4, pp. 16-20, Winter 1988/1989.*
"An Investor's Guide to Collateralized Mortgage Obligations (CMOs)", The Bond Market Association, 1999.*
"An Investor's Guide to Pass-Through and Collateralized Mortgage Securities", The Bond Market Association, 1997.*
Hu, "Secondary Market: The American Model", Mortgage Banking, v51n7, pp. 14-23, Apr. 1991.*

(Continued)

*Primary Examiner*—Nga Nguyen
(74) *Attorney, Agent, or Firm*—Barnes & Thornburg LLP; Thomas J. Donovan

(57) ABSTRACT

A method and system for underwriter offering of multi-class instruments including a central processing unit (CPU), a program memory, a structure database and an investor database. The structure database stores a structure representative of a plurality of classes of a multi-class instrument, and the system operates to (i) inform investors of class information related, respectively, to each class of the multi-class instrument, (ii) receive bid information from investors, (iii) modify the structure database in response to the bid information and subsequently inform investors with updated class information; and once it is determined that the underwriter can profitably underwrite the transaction, (iv) notify the underwriter of an amount of collateral to purchase to cover accepted bids.

12 Claims, 17 Drawing Sheets

OTHER PUBLICATIONS

Esaki, "Testing the Foundation", Mortgage Banking, v51n7, pp. 8-12, Apr. 1991.*
Kelley, "CMOs Offer Higher Returns, Greater Risk", Pacific Banker, v85n7, p. 10, Apr. 1988.*
Bush, "Different Payers Give the Market a New Look", Savings Institutions, v112n10, pp. 18-23, Oct. 1991.*
Forsyth, "Tranche Warfare: In CMOs, It's the Institutions vs. Individual Investors", Barron's v71n33, pp. 12-13, Aug. 1991.*
Angell, "Evaluating Investments in CMOs", Real Estate Review, v21n2, pp. 41-48, Summer 1991.*
Battles, "Multi-Class Securities: An Integrated Policy for Thrifts", Real Estate Finance, v5n3, pp. 21-27, Fall 1988.*
Gooch, "CMOs and REMICs: A New Twist on Traditional Mortgage-Backed Securities", Credit Union Management, v11n5, pp. 16-17, 31, May 1988.*
Hu, "Derivative Securities Help Protect Mortgage Investments", Savings Institutions v109n3, pp. 80-87m Mar. 1988.*
Wertz, "Collateralized Mortgage Obligations", CPA Journal, v57n11, pp. 68-71, Nov. 1987.*
Woolley, "CMOs: Are The Solid Yields Worth The Uncertainties?", Business Week, No. 3262, p. 114, Apr. 1992.*
Bisker, "Investing-By-Numbers", Credit Union Management, v15n3, pp. 36-37, Mar. 1992.*
P. Badger, "Understanding and Analyzing Risk in the Mortgage Market", Spires Financial, 1998.
R. Barry, W. Chau, L. Pendergast, J. Webb, "Mortgage-Indexed Amortizing Notes", Investement Dealers'Digest, Inc., 1996.
"Fas 133 Turning Services to PO's", American Banker, Inc.,p. 1, May 17, 1999.
G. Hutto, A Primer on Hedging Servicing, (Mortgage Industry, Servicing), Mortgage Bankers Association of America, p. 74, Jun. 1, 1996.
J. Dwyer, "Battling Prepayment Risks" Motgage Bankers Association of America, p. 87, Dec. 1, 1998.
"Issuers Look to Hedge Spread Risk", Derivates Week, May 3, 1999, vol. VIII, No. 18.
J. Haggerty, "FASB Rules Set to Snag Corporate Hedging Strategies", Derivatives Week, Jun. 14, 1999, vol. VIII, No. 24.

Offering Notice, Federal Home Loan Banks $25,000,000 Consolidated Bonds, Bloomberg Professional, 1999.
"JP Morgan in $9.72bn Credit Default Scheme" Financial Times, UMI Company, p. 24, 1997.
A. Sikri, "J.P. Morgan Brings Novelty to Derivatives" The Wall Street Journal Europe, p. 10, Dec. 31, 1997.
"Variable Average Notes", Performance and Evaluation, Presentation to William Blair & Co., Inc. Morgan Stanley, Oct. 1995.
"REMIC & SMBS Securities Tranche Types", Fannie Mae. (undated).
T. Gutner, "How the Internet is Reshaping the World's Largest Financial Market", Business Week Online, Nov. 15, 1999.
M. Casey, "Cantor's eSpeed TradingLooks Beyond Wall Street", The Wall Street Journal Interactive Edition, Jan. 20, 2000.
"Overview of Our Business", espeed Today. (undated).
G. Zuckerman "Biggest SecuritiesFirms Grab Lead in Online Bond Trading", TradeWeb the online Bond Market, Jul. 27, 1999.
MuniAuction Brochure, Competitive Bid Process, 1997.
S. Landis, "E-Mortgage Frenzy: B-to-B Applications Speed Lending", The Wall Street Journal Interactive Edition, Dec. 12, 1999.
S. Landis, "E-Mortgage Frenzy: From Orginations to Securitization", The Wall Street Journal Interactive Edition, Dec. 27, 1999.
S. Marjanovic, Company that Links Buyers, Sellers of Mortgage Pools Aims to Raise $15M, American Banker Online, Dec. 27, 1999.
G. Zuckerman"Online Firm Prepares Auction of Munis Without the Brokers", Wall Street Journal Interactive Edition, Dec. 7, 1999.
G. Zuckerman"Bond Auction Goes Online and Then Goes Off-Line", Wall Street Journal Interactive Edition, Dec. 16, 1999.
D. Aubin, "Electronic Bond Auction Would Bypass Underwriters", Dow Jones Newswires, Capital Market Reports, Jul. 19, 1999.
S. Kite, "Online Company Looks to Replace Underwriters", American Banker, Inc., Asset Sales Report, Jul. 26, 1999.
V.V. Chari, R. J. Weber, "How the U.S. Treasury Should Auction Its Debt", Federal Reserves Bank of Minneapolis Quarterly Review, Fall 1992, vol. 16, No. 4.
"Credit Suisse First Boston to Market 'Triangle' Notes", The Wall Street Journal Europe, Oct. 3, 1997.

* cited by examiner

Class 1 Display

Planned Amortizing Class
Underlying Security: FNMA 7% Pool ID: 400210
Coupon: 6.25%
Face: $1MM
Payment Frequency: Semi-annual
Average Life: 4 years
PAC Band 200 PSA - 400 PSA

|  | Your Bid | Market |
|---|---|---|
| Bid Amount: |  | $1MM |
| Bid Price: | ____ % | 99.25% |

[ COMMIT ]

Figure 3A

Class 2 Display

Support Bond
Underlying FNMA 7% Pool ID: 400210
Minimum Coupon: 7.0%
Face Amount: $8MM
Average Life: 18 years
Payment Frequency: Semi-annual
Avg Life at 100 PSA: 20 Years
Avg Life at 500 PSA: 1 Year

|  | Your Bid | Market |
|---|---|---|
| Bid Amount: |  | $12MM |
| Bid Price: | ___ % | 100% |

COMMIT

Figure 3B

Class 1 Display

```
5 Year Prepayment Floor
Reference Security: FNMA 7% Pool ID: 400210
Credit: U.S. Treasury
Strike Rate: 270%
Coupon: 10%
Notional: $4MM
Payment Frequency: Semi-annual Your Bid        Market
Bid Amount:                   $16MM
Bid Price:    ___ %           7.50%

[COMMIT]
```

Figure 6A

Class 2 Display

5 Year Fixed Maturity Mortgage
Reference Security: FNMA 7% Pool ID: 400210
Credit: U.S. Treasury
Initial Coupon: 7.00%
Alternative Coupon: 3.67%
Trigger PSA: 270% PSA
Face Amount: $12MM
Payment Frequency: Semi-annual

|  | Your Bid | Market |
|---|---|---|
| Bid Amount: |  | $12MM |
| Bid Price: | ____ % | 100% |

[ COMMIT ]

Figure 6B

*Prepayment Cap Database Table Structure*

| Field Name | Field Type | Description |
| --- | --- | --- |
| InstId | Integer | Instrument Id of this cap |
| BidPrice | Double | Price buyer is wiling to pay for cap |
| BidUserId | Integer | Membership Id of Person Buying Prepayment Cap |
| BidTime | Time | Time Price for Prepayment Cap was Entered |
| BidValidTime | Time | Time when Bid Price expires |
| BidCancelTime | Time | Time When Bid Price as canceled |
| CollateralType | String | String indicating collateral code: GNMA,FNMA,FHLMC,WholeLoan |
| WAC | Double | Weighted Average Coupon of Collateral |
| WAM | Double | Weighted Average Maturity of Collateral (in months) |
| PoolId | Long Integer | Id of Pool in Mortgage Ref Database |
| PSA Strike Rate | Double | Minimum PSA Rate at which Payment Occurs |
| Max Payment | Double | Max Payment Amount |
| Payment Style | Text | Constant,Normal,Formula |
| Payment Freq | Text | Payment Frequency (Monthly,Quarterly,SemiAnnual,Annual) |
| Maturity | Double | When cap expires |
| AskUserId | Time | Membership Id of Person Buying Final Maturity Mortgage Note |
| AskPrice | Double | Price Member is willing to pay for Final Maturity Mortgage Note |
| AskTime | Time | Time Price for Final Maturity Mortgage Note was entered |
| AskValidTime | Time | Time When AskPrice prices |
| AskCancelTime | Time | Time When Ask Price was canceled |
| AskInstId | Long Integer | Id of Final Maturity Mortgage Note |

Figure 8A

Prepayment Cap Sample Transaction Layout

| Field Name | Sample Values |
|---|---|
| InstId | 24001 |
| BidPrice | $1,000,000 |
| BidUserId | 22 |
| BidTime | 01/24/2000 11:15:22 CST |
| BidValidTime | 01/24/2000 12:30:00 CST |
| BidCancelTime | NULL |
| CollateralType | FNMA |
| WAC | 7.50% |
| WAM | 350 |
| PoolId | NULL |
| PSA Strike Rate | 270% |
| Max Payment | 500,000 |
| Payment Style | Formula |
| Payment Freq | QTR |
| Maturity | 1/24/05 |
| AskUserId | 67 |
| AskPrice | $1,200,000 |
| AskTime | 01/24/2000 12:01:04 CST |
| AskValidTime | 01/24/2000 13:00:00 CST |
| AskCancelTime | NULL |
| AskInstId | 24111 |

Figure 8B

Prepayment Cap Payout Structure

| Field Name | Field Type | Description |
|---|---|---|
| InstId | Integer | Instrument Id of this cap |
| PSAId | Double | PSA Identifier |
| PSAAmt | Double | Percent of MaxAmount Paid at this PSA |

Prepayment Cap Sample Payout Layout

| Field Name | Field Type |
|---|---|
| InstId | 24001 |
| PSAId | 270 |
| PSAAmt | 10% |
| InstId | 24001 |
| PSAId | 300 |
| PSAAmt | 25% |
| InstId | 24001 |
| PSAId | 350 |
| PSAAmt | 35% |
| InstId | 24001 |
| PSAId | 400 |
| PSAAmt | 40% |
| InstId | 24001 |
| PSAId | 500 |
| PSAAmt | 100% |
| InstId | 24001 |
| PSAId | 2000 |
| PSAAmt | 100% |

Figure 8C

Final Maturity Mortgage Table Structure

| Field Name | Field Type | Description |
| --- | --- | --- |
| InstId | Integer | Instrument Id of this Final Maturity Mortgage |
| BidPrice | Double | Price Member is willing to pay for Final Maturity Mortgage Note |
| BidUserId | Integer | Membership of Id of Member buying FMMN |
| BidTime | Time | Time Price for FMMN was entered |
| BidValidTime | Time | Time when Bid Price expires |
| BidCancelTime | Time | Time When Bid Price as canceled |
| FMMN Maturity | Double | Absolute Final Maturity of FMMN |
| FMMN Pmt Freq | Text | Payment Frequency (Monthly,Quarterly,SemiAnnual,Annual) |
| FMMN Und Cusip | Text | Cusip of Underlying Collateral |
| FMMN Rating | Text | Credit Rating of Underlying Collateral |
| FMMN Coupon | Double | Coupon on FMMN |
| FMMN Amount | Double | Amount of FMMN to be Purchased |
| AskUserId | Time | Membership Id of Person Buying Final Maturity Mortgage Note |
| AskPrice | Double | Price Member is willing to pay for Final Maturity Mortgage Note |
| AskTime | Time | Time Price for Final Maturity Mortgage Note was entered |
| AskValidTime | Time | Time When AskPrice prices |
| AskCancelTime | Time | Time When Ask Price was canceled |
| AskInstId | Long Integer | Id of Final Maturity Mortgage Note |

Figure 8D

Final Maturity Sample Layout

| Field Name | Field Type |
|---|---|
| InstId | 24111 |
| BidPrice | TsyYld + 50 bp |
| BidUserId | 67 |
| BidTime | 01/24/2000 12:01:04 CST |
| BidValidTime | 01/24/2000 13:00:00 CST |
| BidCancelTime | NULL |
| FMMN Maturity | Jan 31 2007 |
| FMMN Pmt Freq | SA |
| FMMN Und Cusip | FAA2001232X111 |
| FMMN Rating | US Govt Agency |
| FMMN Coupon | 7.15% |
| FMMN Amount | $35,000,000 |
| AskUserId | 22 |
| AskPrice | TsyYld + 30 bp |
| AskTime | 01/24/2000 12:01:04 CST |
| AskValidTime | 01/24/2000 13:00:00 CST |
| AskCancelTime | NULL |
| AskInstId | 24001 |

Figure 8E

Underwriter's Table Structure

*Underwriter's Table*

| Field Name | Field Type | Description |
|---|---|---|
| AuctionId | Integer | Identifier for Auction |
| Start Time | Date | Start Time of Auction |
| End Time | Date | Scheduled End Time for Auction |
| Arb Profit | Double | Arb Profit as Percent |

Figure 8F

Underwriter's Table Sample Layout

| Field Name | Field Type |
|---|---|
| AuctionId | 6510101 |
| Start Time | Mar 1 2000 14:10:00 CST |
| End Time | Mar 1 2000 16:30:00 CST |
| Arb Profit | 0.25% |

Figure 8G

Instrument Structure Table

*Instrument Structure Table*

| Field Name | Field Type | Description |
|---|---|---|
| Auction Id | Integer | Id Number for Auction |
| Class Id | Integer | Id number for this class |
| Min Size | Double | Minimum Size for this class |
| Increment | Double | Increment for this class |
| Max Size | Double | Maximum Size for this class |
| Type | Text | Class,Reference,Collateral |
| Price Source | Text | Source of Pricing for this class |
| Valuation Rule | Text | Function that determines value |
| Inst Type | Text | Instrument type |
| Rating | Text | Credit Rating of Instrument |

Figure 8H

Instrument Structure Sample Layout

| Field Name | Field Type | Description | |
|---|---|---|---|
| Auction Id | Integer | | 651000 |
| Class Id | Integer | | 1231 |
| Min Size | Double | | $4,000,000 |
| Increment | Double | | $1,000,000 |
| Max Size | Double | | $100,000,000 |
| Type | Text | Class | |
| Price Source | Text | NA | |
| Valuation Rule | Text | FMM001 | |
| Inst Type | Text | FMM | |
| Rating | Text | Agency | |

Figure 8I

METHOD AND SYSTEM FOR INTERACTIVE INITIAL OFFERING OF MULTI-CLASS FINANCIAL INSTRUMENTS

BACKGROUND

1. Field of the Invention

The present invention is directed to financial services and more particularly to an electronic and financial method and system for initial offerings of multi-class securities or other financial instruments. The present invention is also directed to a method of reducing or even eliminating risk to investors in multi-class instruments.

2. Background of the Invention

Part of the financial innovation in the 1980s was the development of multi-class debt instruments with embedded options. An embedded option is an option that is attached to the security. The embedded option may, for example, impact the principal payment, interest payment or both. Typically, these debt instruments are collateralized with U.S. government securities, agency securities or agency-guaranteed pass through mortgages, i.e., a collateral pool. The cashflow from this collateral pool is allocated to the different classes of the multi-class instrument according to a predetermined formula specified in a trust indenture document associated with the multi-class instrument. A multi-class instrument can be either an actual security (as defined by the Securities and Exchange Act of 1934) or a notional swap transaction.

The face value of a transaction refers to the amount of principal that an investor pays up front when the transaction is initiated. Over the life of the instrument, the investor will receive back the principal amount that was paid up front. For example, if an investor buys $100 MM face value of Treasury notes, the investor will receive $100 MM in principal at the maturity of the notes. The interest component of the investment is linked to the face value. If the coupon rate is 10% and the face value is $10 MM, the interest payment will be $1 MM ($10 MM*10%=$1 MM).

The market value of the transaction is simply the price of the instrument multiplied by the face value. The price of an instrument is often expressed in percentage terms. A price of 103 actually means 103%. An instrument with a face value of $10,000,000 and a price of 105% will have a market value of $10,500,000. An investor who pays 105% for an investment with a face value of $10,000,000 must pay $10,500,000 to initiate the deal. But the investor will only receive $10,000,000 in principal back—not $10,500,000. All interest payments are tied to the face value of $10,000,000.

In a notional value transaction no principal is exchanged. The notional value simply serves as a computational tool to compute market value and interest payments. If an instrument has a notional value of $10,000,000 and a market price of 105%, the investor would only pay $500,000 to initiate the transaction. If the notional transaction had a coupon rate of 10%, the instrument would pay $1,000,000 in interest.

A multi-class structure can include all notional instruments, all face value instruments, or any combination of the two.

Examples of multi-class instruments include Collateralized Mortgage Obligations (CMOs), Collateralized Bond Obligations (CBOs), Collateralized Loan Obligations (CLOs), Stripped Mortgage Backed Securities (SMBS) and a broad variety of structured notes such as Indexed Currency Option Notes (ICONs), BISTRO (Broad Indexed Structured Trust Offering), Indexed Amortizing Notes (IANs), range floaters, and credit linked notes.

Such instruments serve an important function in capital markets in that they allow a convenient mechanism for investors to literally buy and sell financial risks such as interest rate risk, credit risk, mortgage prepayment risk, currency risk, or credit default risk.

Additionally, these instruments allow investors to benefit from future market conditions such as the level of interest rates, the shape of the yield curve, the spread between U.S. government rates and other corporate rates, currency exchange rates, mortgage prepayment rates, credit default rates or the value of another asset (e.g., gold price, oil price, or stock price).

The various classes (often called "tranches") of a multi-class security need not be the same size. Indeed, the sizes of the classes can vary significantly. Generally, the only restriction is that the sum total of the cashflow to all of the classes equals the total cashflow generated by the underlying collateral.

FIG. 1 illustrates a typical multi-class instrument known as a collateralized mortgage obligation (CMO) based on Federal National Mortgage Association (FNMA) collateral. In this case, a pool of FNMA collateral worth nine million dollars and having an average life of ten years is offered in two separate classes. The first class (Class 1 in FIG. 1) is a planned amortization class having a face value of one million dollars and an average life of four years. Class 2, on the other hand, is a support bond having a face value of eight million dollars and having an average life of eighteen years. Note that the face values of the two classes do not include an underwriter's profit or administration costs, issues that are addressed later herein.

It is often the case that the cashflow allocation structure of a multi-class instrument is such that under certain market environments, an investor stands to make a substantial return while under alternative market environments, the investor could face significant losses. For example, assume Class A of a multi-class instrument provides for interest of 1% if the yield on the five-year Treasury is 6% or lower. If, on the other hand, the yield on the five-year Treasury is greater than 6%, the interest rate on Class A would jump to 9%.

Investors cannot ordinarily obtain such financial positions through direct investments in the underlying collateral. For example, no direct investment in any Treasury instrument would provide a payoff of 9% under some set of circumstances and a payoff of 1% under another set of circumstances.

Instruments with such asymmetric payoffs appeal to two types of investors: speculators and hedgers. A speculative investor usually has a strong view about future market conditions and wants investments that will generate substantial returns should those conditions materialize. A hedger, in contrast, has concerns about the impact of adverse market conditions on other existing investments or future business operations. For example, if interest rates rise dramatically, an investor might lose significantly on current investments.

In the multi-class instrument example described immediately above, a speculator who felt confident that the five-year Treasury would yield over 6% would want to purchase Class A. An investor who would be hurt financially if the yield on five-year Treasury securities went over 6%, might consider the purchase of Class A as a hedge.

In addition to asymmetric payoffs, investments in certain classes of multi-class instruments are perceived to be less risky than investments in the actual underlying instrument.

For example, in a CMO (like that illustrated in FIG. 1), the cashflow from an underlying portfolio of traditional mortgages is allocated such that some classes receive greater protection against mortgage prepayment risk than a direct investment in the traditional mortgage security. Other classes are more exposed to prepayment risk. The classes with lower prepayment risk carry a lower yield while classes with greater prepayment risk carry a higher yield. Investors seeking lower prepayment risk cannot obtain such a position through a direct investment in the underlying mortgage collateral. Similarly, investors with an appetite for greater prepayment risk cannot obtain such a risk profile through direct investments in traditional mortgages.

In a CBO, the cashflow from an underlying portfolio of corporate bonds is allocated such that some classes receive greater protection against issuer default than a direct investment in the portfolio of corporate bonds. Other classes have greater exposure to borrower defaults. The classes with less default risk carry a lower yield. The classes with the greater default risk carry a higher yield. Direct investments in the underlying collateral of corporate bonds cannot produce these desired exposures.

In the CBO and the CMO, the structure of the entire multi-class instrument is transparent and readily observable to all potential investors. The trust indenture documents clearly list all the classes of the structure and their right to the cashflow allocation. A multi-class instrument need not directly list or disclose all the classes, however.

A note with an embedded option is an example of a structure where the multi-class nature of the structure is hidden. An Indexed Currency Option Note (ICON) is a note where the final principal returned at maturity is linked to a foreign exchange rate. An ICON linked to the dollar/yen rate, for example, would pay a regular stated coupon. At maturity, the investor would receive a principal amount tied to the dollar/yen exchange rate on the maturity date. The principal redemption formula might be a formula such as: 100% return of principal if dollar/yen is above 150; otherwise receive Exchange_Rate/150 of principal. If dollar/yen exchange reaches 110, the return of principal would be 110/150 or 73.33% of principal.

The investor in this note only sees the interest payment and principal redemption schedule. In this case, this schedule only shows the amount of interest and principal due to the single Class. No mention is made of what happens to the principal that is not returned to the investor. In fact, the ICON structure consists, typically, of a traditional bond (usually a Treasury or federal agency note) and option position on exchange rates. The buyer of an ICON has sold an option on exchange rates. The underwriter has usually made alternative arrangements to find a buyer for the option sold by the ICON investor. The underwriter may even purchase the option to hedge internal proprietary positions.

Note that there is no actual investment in Japanese Yen currency or Japanese Yen denominated investments. The return is indexed (i.e., linked) to the Japanese Yen exchange rate. Multi-class instruments will often allocate cash flow to the underlying classes based on the value of some external index such as a foreign exchange rate, change in the value of an equity index (e.g., S&P 500), prepayment speeds on a mortgage pool, or the price level of a commodity (gold, oil).

The presence of the underlying collateral (the Treasury or federal agency note) removes any concern regarding performance risk. Neither the investor in the ICON nor the buyer of the foreign exchange rate option need worry that they will not receive the promised cashflow. The cashflow rules are set such that the collateral will always generate the promised cashflow in all but the most extraordinary circumstances (e.g., failure of the United States Government to honor its debt obligations).

The underlying collateral in the ICON is usually placed in an irrevocable trust with a well established fiduciary hired to implement the cashflow allocation rules. This embedded performance guarantee of these multi-class securities effectively avoids the need for margining as is common with transactions in "exchange traded options" instruments. The lack of margining also often leads to more favorable accounting treatment for certain investors in certain cases.

In all the examples of multi-class instruments discussed above, a critical consideration is that if an underwriter undertakes to sell one class, the underwriter must also sell all other classes for the transaction to be profitable. For example, in the case of the ICON, the underwriter must find a buyer for the ICON and the foreign exchange option. This concept is discussed in detail below.

Underwriter Role and Economics

The objective of the underwriter is to structure the various classes of a multi-class instrument so that the total market value obtained from selling each class exceeds the cost of purchasing the securities and administrative costs of establishing and administering the trust. For example, assume that the total cost of the underlying collateral of the multi-class instrument is $100 million and the cost of establishing and administering the trust is $1 million. The effective cost to the underwriter is therefore $101 million. Now, assume that the underwriter creates a multi-class security with three classes: the underwriter might price Class 1 at $51 million, Class 2 at $30 million and Class 3 at $21 million. If successful in placing all the classes, the offering will generate $102 million (51+30+21) in revenues and, therefore, $1 million in potential profits.

In accordance with prior art financial methods, the underwriter must first purchase the collateral and then attempt to sell the different classes. Significantly, if the transaction is to be successful, the underwriter must be able to sell all of the classes at the target price. However, the underwriter is susceptible to several risk factors before all of the classes are sold.

For example, there might be no demand for one or more classes at the underwriter's target price. In this case, the underwriter must lower the price on the unsold classes. This reduction could reduce or eliminate any profit from the transaction. In the above example, if the underwriter is forced to sell Class 3 at $17 million (instead of $21 million), the underwriter win net only $98 million from the sale of all of the classes. Accordingly, the underwriter will lose nearly $3 million on the transaction. The lack of demand may have various causes. One common reason is that even though the underlying collateral (e.g., mortgages on houses, condominiums, etc., in the case of a CMO) might be considered low risk, the prepayment schedules on the mortgages are sometimes very unpredictable. This unpredictability tends to make subordinate classes of a multi-class instrument less attractive to investors.

Further, the underwriter may not be able to sell the classes at any reasonable price and therefore must hold on to the classes for an indefinite period of time. During this period, the underwriter is subject to potentially large financial risks inherent in these classes such as prepayment risk, interest rate risk, price risk or credit default risk. Consider an example of a two class instrument. Class 1 receives 120% return of principal if the dollar-to-yen exchange rate is above 110. Class 2 only receives an 80% return in that case. If the underwriter is unable to sell Class 2, the underwriter bears the full risk of paying the Class 1 investor the extra 20% return.

The underwriter is also subject to market risk between the time the collateral is purchased and the time the classes are sold. For example, changes in the market level of interest rates can cause a dramatic fall in the value of the collateral. The underwriter bears this loss. Consider what happens in the above example where the underwriter purchases the collateral for $100 million. Market conditions change and the value of the collateral falls to $95 million. The underwriter had planned to sell the individual pieces for $102 million, or a 2% premium over the current market price. The current market price is now $95 million. Even if the underwriter can earn the 2% premium, the underwriter will net only $96.9 million and will, therefore, realize a loss of nearly $3.1 million on the transaction.

While sophisticated hedging techniques involving financial futures, options, and other instruments can reduce the underwriter's exposure to market moves, these techniques involve additional costs and carry additional management and administrative burdens. Moreover, improper hedging techniques can actually increase the potential for losses.

In view of these risk factors, only well capitalized underwriters with large distribution networks have heretofore taken part in offering multi-class instruments. That is, only a firm with significant capital can afford to hold onto a position if buyers for all classes can not be found. And, only a firm with a large distribution network has the resources to find buyers for all classes. However, the extensive capital and large network of such firms only serve as a cushion against the risks of these transactions; the risks are not eliminated.

In recent years, electronic trading systems have been developed for many financial products. Investors can purchase equities, bonds, money market instruments, derivative instruments, futures, options, and various commodities over private electronic networks and over public electronic networks such as the Internet. Both buyers and seller can post their transaction price on these systems and clear the transactions. However, all of these systems only handle single class instruments where a seller of, for example, 100 shares of stock does not also incur a concurrent obligation to sell additional shares of other stock.

There has also been a lack of attention given to improving the demand for multi-class instruments and, particularly, the more subordinate classes thereof.

SUMMARY OF THE INVENTION

In view of the limitations of (i) current electronic trading systems and (ii) multi-class instrument structuring, the present invention provides an electronic trading system over which registered investors can, preferably in real time, commit to purchase initial offerings of multi-class securities offered by one or more underwriters. The present invention also provides an improved multi-class instrument whereby risk to investors is substantially reduced.

The system preferably operates over either a private electronic communications network or over a public communications network such as the Internet, or both. Investors who meet certain minimum financial standards and who preferably sign appropriate contracts that guarantee performance would be permitted to purchase instruments using the system.

In a preferred embodiment, the system, implemented on a general purpose or specially designed electronic computer, enables an underwriter to enter a detailed description of the underlying collateral, a description of the underlying classes, and the full details of the cashflow allocation rules for each of the classes, administrative costs associated with the offering, and the underwriter's target profit.

The system takes this information and posts on different display sources (preferably one source for each class), the description of the underlying collateral, the description of a single class and the cashflow allocation rule for that class. Investors interested in investing in this class post both the amount and price at which they would like to execute the transaction. By committing to an amount and price, an investor makes a binding commitment for some specified period of time (e.g., 120 seconds). Before this period of time expires, the system responds and indicates whether the offer is accepted or rejected.

During the 120 seconds, investor information (amount and price) is packaged and sent to the underwriter's computer. The system preferably first checks the price and amount with price and amounts posted by investors in the other classes. If the price and amounts conform to the underwriter's profit requirements, cover the underwriter's administrative costs and meet the requirements of the cashflow allocation rules, the transaction is cleared and the system signals to the underwriter the required amount of collateral to purchase.

The formula for translating prices from one class to other classes is determined by the cost of the class, the cost of the underlying collateral, the arbitrage profit desired by the investor, and the cashflow allocation formula. Preferably, prices are quoted to/by investors as either a percentage of par (the price is a percent of the face or notional value of the security) or as initial yield. As mentioned before, a price of 101% would mean that the face value of the securities would be multiplied by 1.01 to determine the cost. Securities with a face value of $10 million at price of 101% would cost $10.1 million.

The price of other classes might be quoted as "yield of 7.50%" or as a spread (e.g., 50 basis points over the current five-year Treasury yield). The yield quotation method implies that the class is being sold at par (i.e., 100% of the face or notional value). This initial yield will become the coupon on the instrument.

If no agreeable prices exist for the other classes, the system of the present invention determines the amount of underlying collateral that the underwriter would need to purchase to meet the investor's demand. The system then obtains the current market cost of acquiring this amount of collateral. Using the cashflow allocation formulas, the system also translates the investor's price to the corresponding prices and amounts for the other classes. These amounts and target prices are then posted as the current market price and amount on the displays for each class.

Investors in these other classes then have the right to execute at the price and amount shown, or submit a counter price and amount.

If the system cannot find the required buyers in the specified time interval, the system preferably permits the underwriter to clear the transaction directly by purchasing the remaining classes for the underwriter's proprietary account.

If investors willing to execute at the market price and agreeable amount can be found for each class, the system sends a signal to the underwriter to clear the transaction and purchase the required amount of the underlying collateral.

Alternatively, the counter amount and price are translated into the corresponding prices for each class and the process iterates until the underwriter sells the desired amount of underlying collateral.

If transactions do not occur, the system permits the underwriter to:

(i) Lower the desired arbitrage profit. This would result in lower prices for the other classes and might make finding buyers for all classes more likely.

(ii) Change the structure of the entire offering by eliminating classes or modifying the cashflow allocation rules. If no buyers can be found for any class, the underwriter can change the cashflow allocation rules to create more and/or different classes. The system also permits the underwriter to change or alter the composition of the underlying collateral to permit different cashflow allocations or to obtain less expensive collateral. In a preferred embodiment of the present invention, the new collateral includes Treasury or Agency notes that tend to reduce the risk for one or multiple classes (tranches) of the multi-class instrument.

(iii) Change the structure of just the classes that are getting poor responses. The system permits the underwriter to change the cashflow allocation between just the classes that have poor responses. This might be accomplished, for example, through the purchase of additional collateral for just these two classes. Alternatively, the system preferably permits the underwriter to merge two or more classes into a more marketable class.

(iv) Withdraw the offering altogether.

In accordance with the present invention, the system avoids the risks to underwriters inherent in current market practice. Unlike current market conventions, underwriters need not risk any capital until all classes, or some minimum amount of at least some of the classes, have been sold. The system directly adapts to changing market conditions so that the underwriter does not bear any market risk. Moreover, by combining types of collateral (e.g., FNMA and Treasury notes) the underwriter can increase demand for one or multiple classes of the multi-class instrument.

With the system of the present invention even underwriters with limited capital to offer multi-class instruments will now be more likely to undertake this type of security offering, especially considering the use of a public electronic communications network, which greatly expands the range of potential customers.

From the other side of the transaction, investors have a more transparent price discovery mechanism and can proactively choose those instruments that best meet their needs. Specifically, the present invention allows both for interactive and iterative negotiation of the transaction to develop a structure that best meets the needs of the market.

It is therefore an object of the present invention to provide an improved electronic trading system for multi-class instruments.

It is a further object of the present invention to provide an electronic trading system for multi-class instruments wherein an underwriter need not carry the burden of purchasing collateral before investors in different classes of a multi-class instrument have themselves committed to investing.

It is also an object of the present invention to provide real-time offering of multiple classes of a multi-class instrument.

It is also an object of the present invention to provide real-time modification of the structure of a multi-class instrument.

It is a further object of the present invention to respond to investor bidding via an acceptance of the offer or a modification of the offer.

It is still further an object of the present invention to provide an electronic trading system for multi-class instruments that operates over the Internet.

It is an object of the present invention to provide an electronic trading system that automatically and dynamically determines an amount and price of each class of a multi-class instrument to secure a desired arbitrage profit.

It is yet another object of the present invention to provide an electronic trading system that notifies an underwriter of the amount of collateral to purchase in response to bids made by investors.

It is still another object of the present invention to provide an electronic trading system that supplies information to investors on a per-class basis.

It is also an object of the present invention to provide a multi-class instrument structure that reduces the risk to investors for at least one class of a multi-class instrument.

These and other objects of the present invention will become apparent upon a reading of the detailed description of the invention in conjunction with the accompanying drawings.

BRIEF DESCRIPTION OF THE DRAWINGS

FIGS. 3A and 3B illustrate exemplary initial display messages in accordance with the present invention.

FIGS. 6A and 6B illustrate exemplary displays in accordance with the present invention.

FIGS. 8A-8I depict exemplary records/fields of the structure and investor databases in accordance with the present invention.

DETAILED DESCRIPTION OF THE INVENTION

Figure 2:
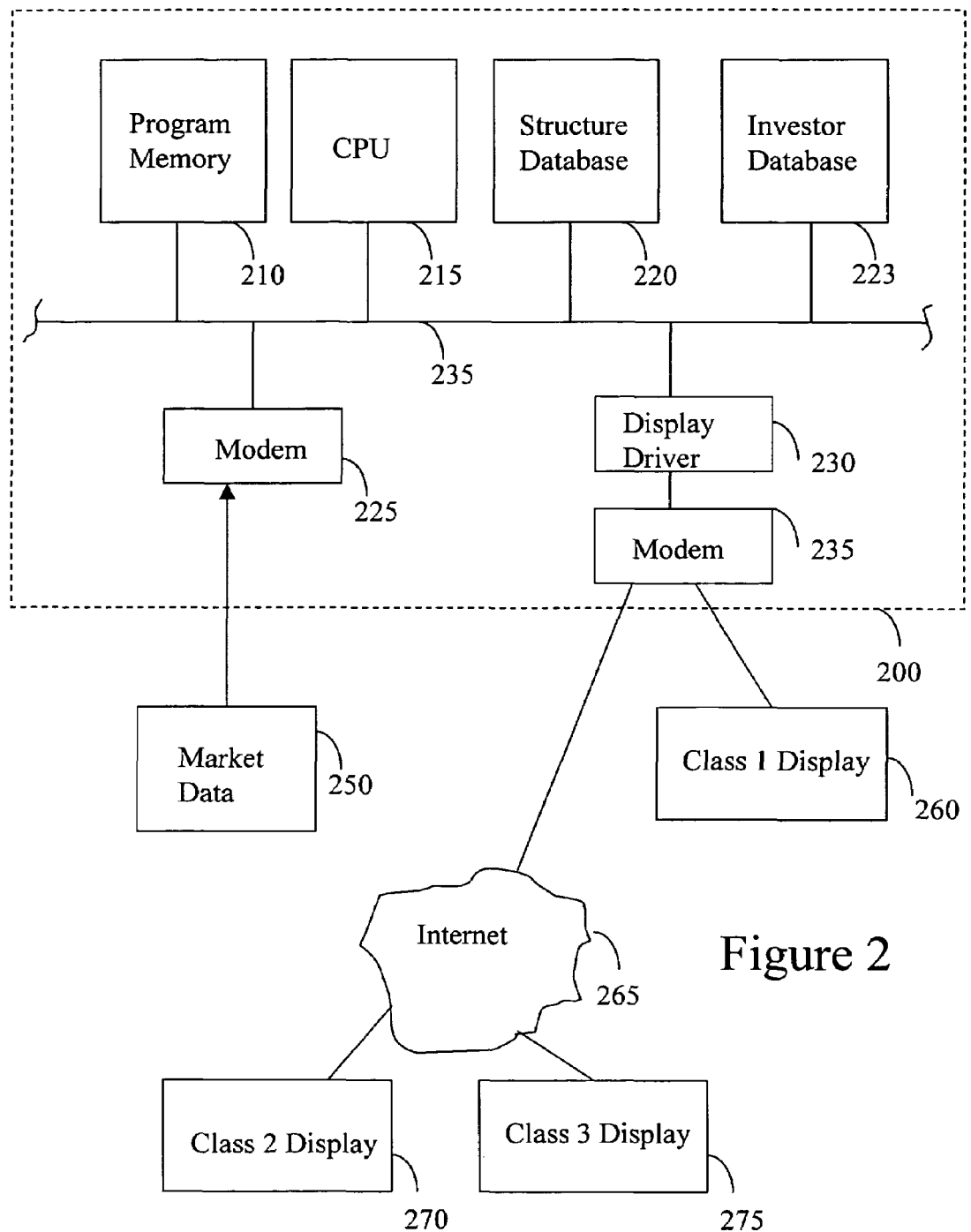
FIG. 2 illustrates a preferred embodiment of the present invention.

FIG. 2 is a schematic diagram illustrating a preferred system for implementing the present invention. System 200 includes program memory 210, central processing unit (CPU) 215, structure database 220, investor database 223, modems 225 and 235 and display driver 230. Preferably, all of these components are connected directly to an address/data bus 235 according to well known computer system implementations. System 200 also includes an input for market data 250 and connections to multiple display units 260, 270, 275, either directly (260) or via the Internet 265 (270, 275).

Figure 1:
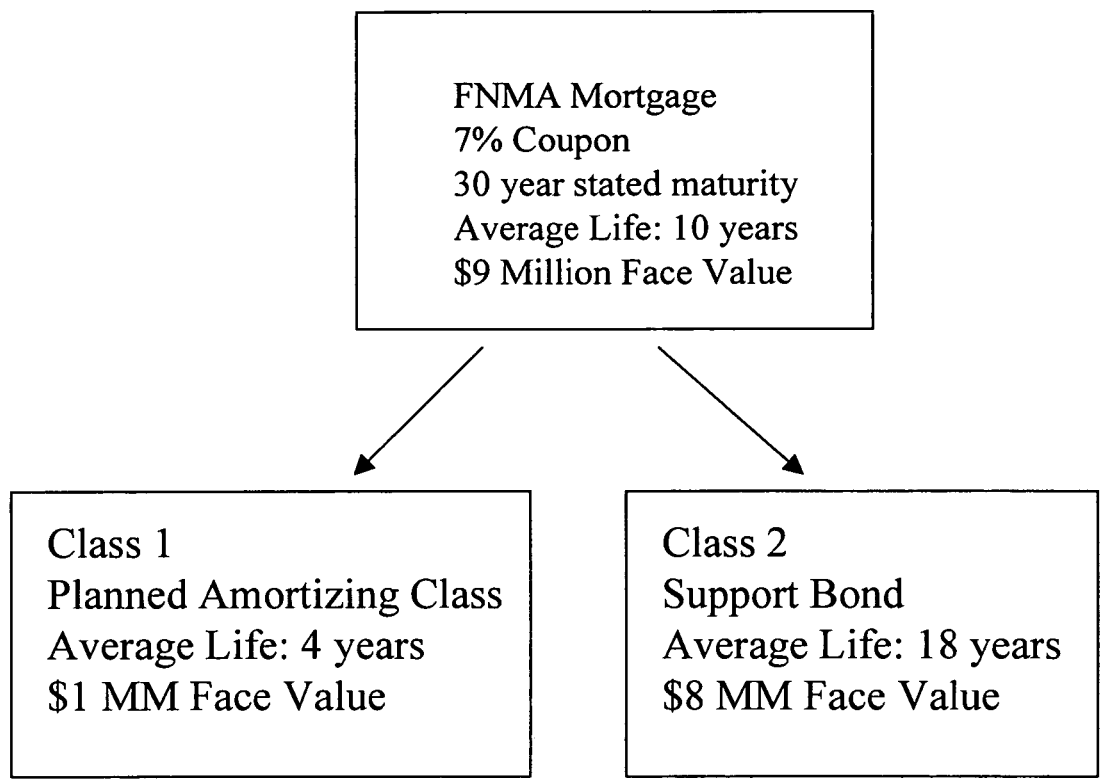
FIG. 1 illustrates the structure of a conventional collateralized mortgage obligation.

Program memory 210 preferably stores the various components of the computer software that operate the present invention. CPU 215 performs the various mathematical calculations associated with the present invention as well as facilitates access to the various components of the system via address/databus 235. Structure database 220 preferably stores the structure of a multi-class instrument like that shown in FIG. 1. Specifically, the structure database preferably stores information including the various classes of the multi-class instrument, the underlying collateral, cashflow allocations rules, class structure, desired arbitrage profit and other parameters for a multi-class instrument, including, the face value of the individual classes and specific information about the underlying collateral.

Investor database 223 preferably includes information about individual investors who have standing contracts with the underwriter such that they are eligible to participate in a multi-class investment offering by the underwriter. Preferably, this database is secure whereby dissemination of any information therein is strictly controlled.

System 200 receives market data 250 via modem 225, for example. The market data may come from a source such as Reuters or Bloomberg. However, any reliable source of information concerning the pool of instruments that is to be offered via a multi-class offering is acceptable. As will be explained in more detail below, market data 250 is compared against bids presented by multiple investors to determine if the underwriter should proceed with a sale of the various classes of the multi-class instrument in view of the prevailing market conditions.

Communication with the various investors is implemented via display driver 230, modem 235 and the various displays 260, 270 and 275. Specifically, as shown in FIG. 2, if system 200 of the present invention is operating under a private network scenario, display 260 (which represents Class 1 in this case) is connected directly to modem 235. Alternatively, or in addition, communication with investors may occur over a public network such as the Internet 265 whereby display 270 and display 275 for Class 2 can be accessed.

FIGS. 3A and 3B show exemplary data displayed on the displays for a two-class multi-class instrument offering. Note that the information shown in FIGS. 3A and 3B is consistent with the structure of the multi class instrument shown in FIG. 1. FIG. 3A indicates a planned amortization class and identifies the underlying security as a 7% FNMA. The particular pool identification number is also provided. In addition, the coupon rate (here 6.25%) is stated so that the investor is aware of the cashflow allocation rules associated with this class. The screen also shows the PSA band for which the average life will be approximately 4 years. Further, the payment frequency is also identified. In the lower portion of the display, there is a market bid amount and bid price as well as an investor ("Your" in FIGS. 3A and 3B) bid amount and price. Further, there is a button, which could be a hard key on a computer terminal or a "button" shown on the display screen, called "commit." Preferably, device driver 230 is capable of supplying the display screens with an HTML format datastream such that the present invention operates seamlessly over the Internet. Of course, any suitable data transmission protocol known by those skilled in the art is considered within the scope of the present invention. Once the investor's bid information is entered and the "commit" button is pressed, the investor's bid information is sent to system 200 via well known techniques, e.g., TCP/IP, or other suitable protocol.

FIG. 3B shows similar information to FIG. 3A except that in this case, as Class 2 of the multi-class instrument, it is indicated that if the coupon is a minimum coupon. The screen also displays the impact of changes in PSA on the average life of Class 2. Thus, the investor is provided the fundamental information necessary to determine whether to invest at all and, if so, how much as well as at what price.

Figure 4:
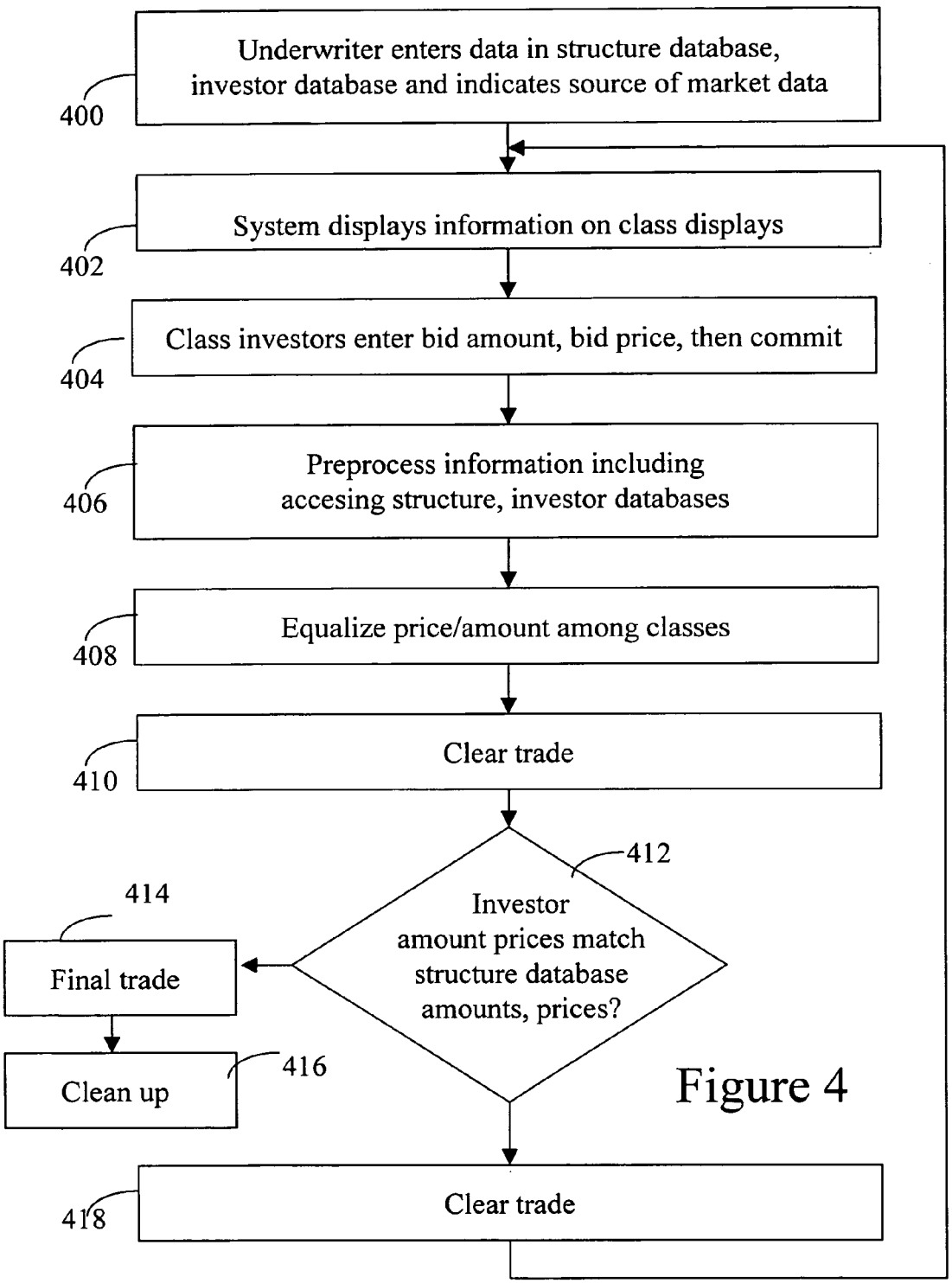
FIG. 4 is a flowchart of the operation of the system of the present invention.

FIG. 4 is a flowchart illustrating the preferred operation of the system of the present invention. Beginning at step 400 an underwriter populates the structure database 220 and investor database 223. Specifically, the underwriter enters information on the underlying collateral, cashflow allocation rules, class structure, desired arbitrage profit and other parameters relating to a particular multi-class instrument. In addition, the underwriter indicates the source of data to value the underlined collateral, i.e., the source of the market data 250. The underwriter also stores in investor database 223 information about investors and their agreed-upon investment limits, if any. Investor database 223 preferably also includes e-mail addresses, telephone numbers and business addresses so that when a transaction is cleared, system 200 can easily notify the investor of the purchase. At step 402, system 200 invokes display driver 230 which obtains the information on the multi-class security from the structure database and sends that information to the individual displays 260, 270, and 275. Preferably, each display displays only a single class of the multiple class instrument offering.

Generally speaking, it is desirable to have each display screen display only a single class rather than multiple classes since, under typical circumstances, the market segments for the different classes are distinct; investors in Class 1 have little interest in the offerings in Class 2. Similarly, investors in Class 2 have little interest in the offerings in Class 1. As an analogy, a person interested in buying a condominium in a downtown setting would probably have little interest in looking at suburban estate property even if both properties were listed by the same real estate agent and the seller of both properties was the same individual. However, where an individual or institution desires access to information regarding multiple classes, the present invention preferably is capable of providing such information.

Moreover, the present invention further contemplates (though not shown) supplying data with respect to like classes of different multi-class instruments to, respectively, multiple display screens at a single location. Accordingly, an investor operating under a particular investment strategy can choose from among similarly styled classes of different multi-class instruments.

Preferably, display driver 230 generates/updates two or more display screens. Each display screen contains information on a particular class. As explained above, the display driver may generate HTML to generate the screen displays over the Internet.

Once system 200 has made an initial offering of a multi-class instrument via any of displays 260, 270, 275, an investor having access to any one of those displays then enters a bid amount and bid price. If the investor believes his entered bid amount and bid price are as desired, the investor then presses the "commit" button or clicks (using a mouse, for example) on a displayed "commit" button. By invoking commit, the bid amount and bid price information along with the investor's identity is sent to system 200 via a private network or public network as described earlier.

At step 406, system 200 preprocesses the information received from the investor. Specifically, preprocessing preferably includes verifying that the price and amount are valid numbers and, if valid, the data is made available for further verification. On the other hand, if the received information is invalid, e.g., the received data includes characters where numbers are expected, system 200 preferably sends a message to the "offending" display indicating that the information was invalid and requesting new information.

Still at step 406, if the information provided by the investor is valid, that information is checked against the investor database to verify that the bid amounts and/or price fall within the guidelines agreed to by the investor and the underwriter. If the amounts and/or price are somehow out of range, a warning/error message preferably is generated by system 200 and displayed on the appropriate display. On the other hand, if the amount and price information is within a pre-agreed range, e.g., not more than five million dollars, system 200 proceeds to step 408.

At step 408, system 200 performs price/amount equalization. More specifically, system 200 reads the parameters from structure database 220, obtains the current price of the underlying collateral via market data 250 and determines the equivalent price and amount for the other classes such that the underwriter maintains his desired profit margin. If, at step 408, a set of prices that matches all conditions set by the underwriter can not be found, the price and amount bid from the investor is rejected and a warning/error message preferably is sent to the appropriate display. On the other hand, if the price and amount bid by the investor of, for example, Class 1 translates to acceptable positions for the other classes, the investor's price and amount information is sent to a clear trade process shown at step 410.

The clear trade process of step 410 checks the recently computed set of equivalent prices and amounts against the structure database 220 for current prices and amounts posted by investors in all of the classes. If a match occurs, at step 412, a final trade process is invoked at step 414, explained below.

If no match is found at step 412, system 200 proceeds to step 418 which is an update trade process. This process updates the structure database with the latest price/amount information received from step 410. The update trade process also updates each of the class displays with the latest current market price/level. The price and amount equalization of step 408 preferably implements industry standard formulas for computing price and yield. Such formulas are published by trade organizations such as the Bond Market Association. Price equalization typically involves an internal rate of return calculation or a net present value calculation. The amount equalization calculations are more algebraic; the amounts preferably are structured so that the cash flow from the underlying collateral will meet all the interest and principal obligations required by each class.

If at step 412 a match was made between the investor amounts and prices and the amounts and prices in the structure database, a final trade process is invoked at step 414. The final trade process preferably clears the transaction. Specifically, at step 414, the structure database is read and the identities of the investors are determined. Those investors are then notified preferably either by e-mail or by other direct means that their respective offers have been accepted and that the trade will be processed.

The final trade step preferably also notifies the underwriter regarding the amount of collateral to buy in view of the accepted bid amounts and prices.

Preferably, the period of time between invoking the "commit" button and an investor receiving a response is relatively short, e.g., 120 seconds, or any other suitable time period, which permits true real-time, dynamic offering of multi-class instruments. That is, class offerings are updated on the respective displays, when necessary, within the 120 second period. Of course, where real time offerings are not necessary, the period of time may be as long as desired.

Finally, at step 416, clean up occurs wherein structure database 220 is cleared of prices and the display screens for each of the classes is updated. The process then again begins at step 400. If no match was made between the investor amounts and price bids and the amounts and price data in the structure database at step 412, after step 418, system 200 returns to step 402 wherein updated information is displayed on the various displays.

As is evident from the foregoing, an underwriter may utilize the present invention to structure or re-structure a multi-class instrument offering such that the underwriter need not be saddled with having to initially purchase the underlying collateral.

Further, as explained above, some classes, especially substantially subordinate classes, of a multi-class instrument are sometimes not particularly desirable and are therefore difficult to place. Thus, there is a need to increase the demand for certain, and preferably all, classes of a multi-class instrument. The present invention provides a way to increase demand for the various classes of a multi-class instrument by reducing the risk associated with each of those classes.

Figure 5:
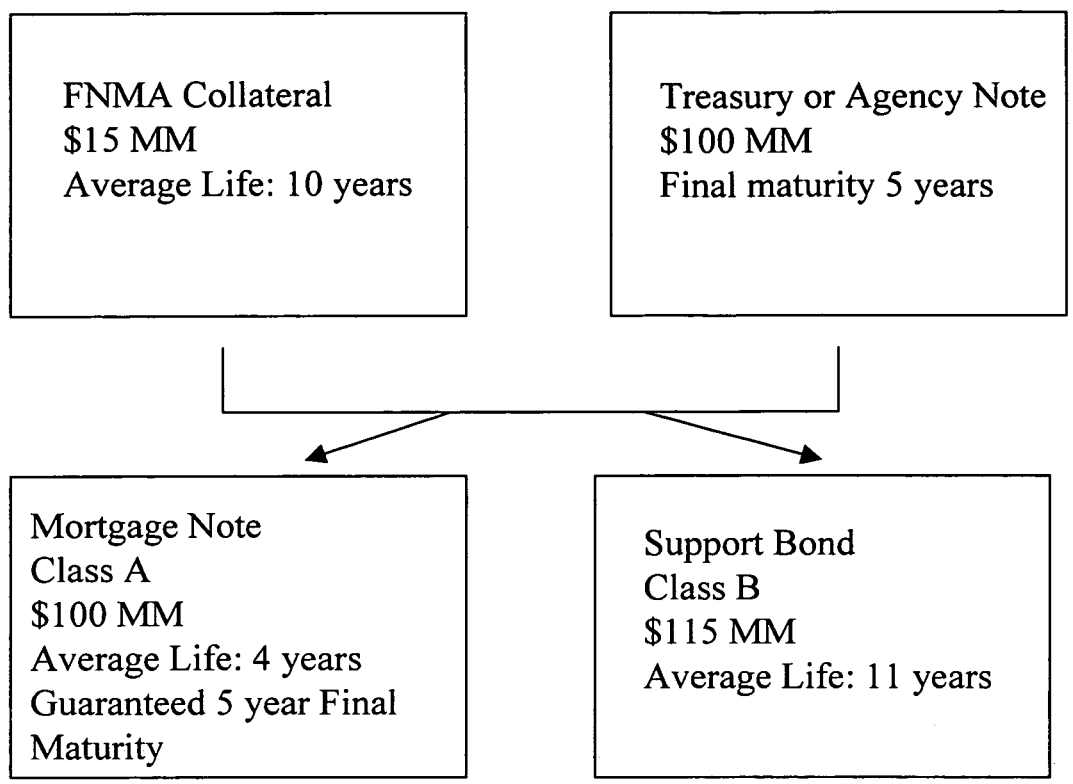
FIG. 5 illustrates the structure of a multi-class instrument having reduced risk in accordance with the present invention.

FIG. 5 illustrates how a conventional pool of FNMA collateral is further collateralized with treasury or agency notes in order to dilute the risk among the classes. Specifically, as shown in FIG. 5, class A receives 7% interest from FNMA. The initial balance is $100 MM. The balance amortizes based on FNMA note prepayments, i.e., the principal pay downs on the FNMA note are passed to class A up to $100 MM. At the end of year five, principal proceeds from the maturity of treasury/agency notes are used to retire any remaining balance on class A.

Class B, on the other hand, receives all coupon interest from the treasury/agency notes. Class B further receives any residual interest from the FNMA note. Further still, class B receives principal from the treasury/agency notes that is not paid out to class A. After year five, class B also receives all proceeds from the FNMA pool.

In this structure, class A has a guaranteed final maturity (regardless of prepayment) and class B has greater protection against prepayments than the underlying FNMA note. By adjusting the ratio of treasury/agency notes to mortgages, the underwriter has the flexibility to increase or decrease the level of protection. Thus, the treasury/agency note combination serves two purposes. First, it provides interest income (which remains constant regardless of prepayments) to class B. Second, it provides enough principal to retire class A at the end of five years.

Thus, in accordance with the present invention, an investor's investment is secured not only by the underlying FNMA collateral, but also by the treasury/agency note. This provides reduced credit risk to individual investors thereby increasing demand even for subordinate classes. Further, the combination FNMA collateral/treasury or agency note structure can be offered to investors via system 200 as well. If such a structure is offered, the individual displays also will be provided information indicating that the class is also underwritten by treasury or agency notes. See FIGS. 3A, 3B, 6A, 6B.

EXAMPLE

Figure 7:
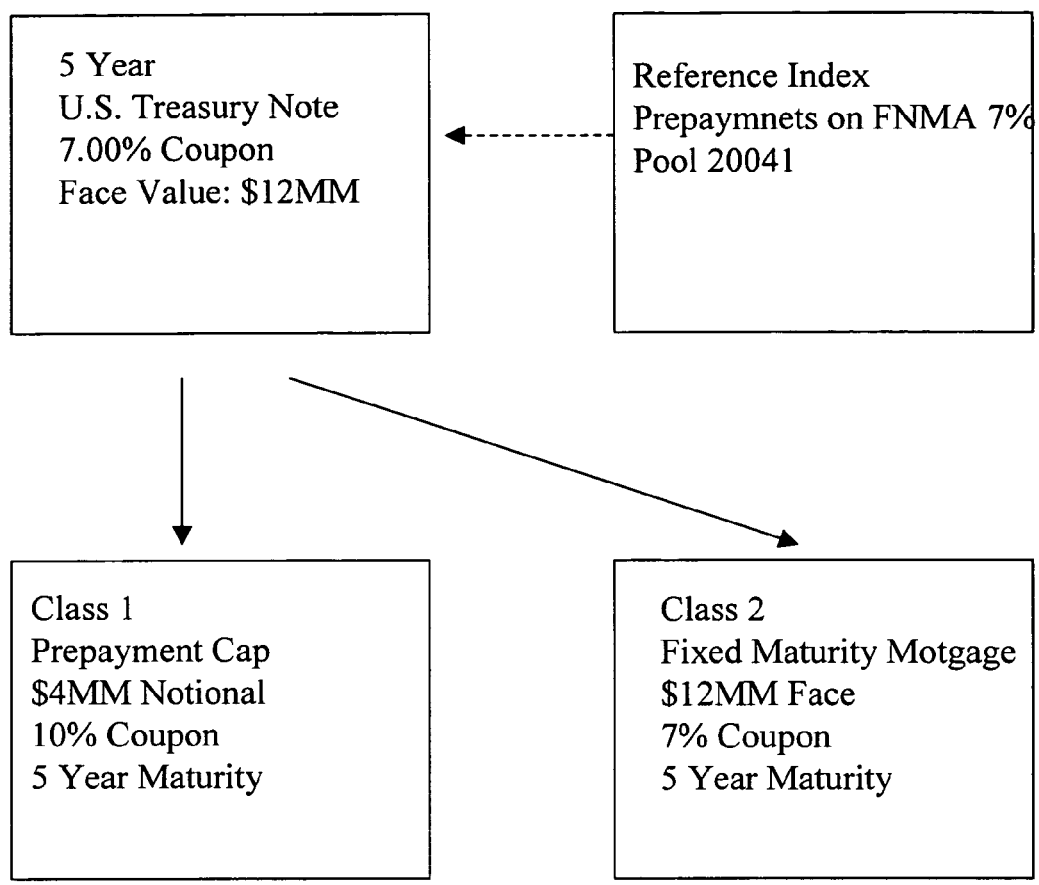
FIG. 7 illustrates a multi-class structure that is used to explain an example in accordance with the present invention.

The following is an example of a use of the electronic trading system of the present invention. The example illustrates how the invention operates with respect to a relatively complicated class structure including Treasury collateral, a reference (index) security, and a class that is strictly notional. Exemplary display screens are shown in FIGS. 6A and 6B and the class structure is illustrated in FIG. 7.

Class 1 is a Prepayment Cap and Class 2 is Guaranteed Final Maturity Mortgage Note. Class 1 is a notional instrument. Recall that with a notional instrument, no principal exchange takes place. The investor makes an up-front payment to initiate the transaction and, at best, will only receive interest based on the notional principal amount. Class 2 is a regular face value instrument. In this case, the investor makes an up front principal payment and will receive the full principal payment at maturity.

U.S. Treasury five-year notes with a 7% coupon are used to collateralize the cash flow for the two classes. The interest cash flow from the notes will be allocated to the two classes contingent upon the prepayments on the reference notes. All principal from the U.S. Treasury notes will be allocated to the Class 2 investor.

The reference notes for this multi-class instrument are FNMA 7% mortgages. No investment is made in these mortgages. Indeed, neither investor may have a position in these instruments. However, the prepayment speed on these instruments is publicly disclosed by FNMA on a monthly basis and is therefore easily implemented as an index security.

The underwriter enters information into the system as follows:

Class 1 Minimum Notional Value of $4 MM (and increments of $1 MM thereafter)
Will receive 10% interest every 6 months if prepayment speed on underlying mortgage pool exceeds 270% PSA during previous six month period
If PSA is 270% or less during the six month period, the interest rate will be 0%
Maturity: Five years
Interest payments backed by U.S. Treasury five-year note
Class 2 Face Amount: Minimum of $12,000,000
Interest equal to 7.00% if prepayments on designated FNMA collateral below 270%
If prepayments exceed 270%, Interest equal to 3.67% for $7 MM face value.
Maturity: Five years
Interest and principal payments backed by U.S. Treasury five-year note The $4 million notional amount and $1 million increment on Class 1 are, in this example, directly set by the underwriter. These amounts might be set to generate sufficient profit to cover overhead and other fixed costs. The rationale for the Class 2 minimum size is discussed below.

The underwriter also enters into the system that the target arbitrage profit is 0.25% of the size of Class 2. This arbitrage profit is subtracted from the proceeds on the transaction. Here, the proceeds consist of the payments from the buyers of both Class 1 and Class 2. The underwriter uses the proceeds remaining after deducting the arbitrage profit to purchase the five-year Treasury notes. The interest payments from the Treasury notes will be allocated solely to Class 2 unless the principal prepayments on the pool of FNMA mortgages exceeds 270% PSA. If the principal payments exceed 270% PSA, $200,000 of the interest cashflow from the Treasury notes is diverted to Class 1.

The Class 1 description is then posted on a display seen by registered Class 1 investors. The Class 1 description would include, inter alia: the maturity of the prepayment cap, the PSA strike rate, the collateral type (FNMA), the payment frequency (semi-annual), the notional amount, and the coupon rate. The Class 2 description is posted on a display seen by registered Class 2 investors. The Class 2 description preferably includes the face amount, the initial yield, the worst case yield, the maturity, and the PSA strike rate.

The following might be a typical scenario of system operation.

1) A Class 1 investor seeing the structure, indicates that he will purchase $4 million notional value of the Class 1 notes at price of 6.25% of par. This information is transmitted to the underwriter's system. A $4 million notional investment with a 10% coupon would generate $200,000 every six months (10%/2×$4,000,000=$200,000) if the principal prepayments on the reference collateral exceeds 270% PSA.

2) The system determines that if $4 million notional of Class 1 are sold, at least $5,714,286 face value of Class 2 securities must be sold. The 10% coupon on $4 million implies a payment of $200,000 every six months (10%/2×$4,000,000=$200,000). The investment in the Treasury note must produce, at least, $200,000 every six months. A face value of $5,714,286 in a 7% note produces exactly $200,000 every six months (7%/2×$5,714,286=$200,000). If the Class 2 size is set at $5,714,286 the worst case yield is approximately 0%. If the prepayments on the reference collateral exceeds 270% PSA from the initiation date, all the interest cash flow will be allocated to Class 1. Class 2 will receive no interest. If the Class 2 investor pays 100% and receives just the interest at the end of five years, he will have earned a 0% return on his investment (0% is the internal rate of return on an investment that pays no interest and returns the full principal at maturity). A larger face value amount will produce a higher worst case yield. For example, a face value of $7,000,000 will produce a worst case internal rate of return of 1.29%. A $7,000,000 investment will produce $245,000 in interest income every six months (7%/2*$7,000,000=$245,000). Even if $200,000 is allocated to Class 1, $45,000 remains for Class 2. This cash flow stream translates into an internal rate of return of 1.29%. A face value of $12,000,000 will produce a worst case internal rate of return of 3.67%. A face value of $50,000,000 will produce a worst case internal rate of return of 6.20%. The system preferably is programmed to force Class 2 to be of sufficient size to produce some minimum worst case yield. The system can also allow Class 2 investors to select any size (rounded to the nearest $100,000) in excess of $5,714,286. In this example, we will assume that the underwriter wants Class 2 to have a minimum face value of $12,000,000 face value. Again, the arbitrage profit at this level produces the minimum level of revenue needed to cover fixed and other overhead expenses for the underwriter.

3) The system translates the Class 1 investor's quote of 6.25% of par into a price of $250,000 (6.25%×$4,000,000=$250,000).

4) The system subtracts the target profit of 0.25% ($12,000,000*0.25%=$30,0000) from the $250,000 proceeds and allocates the remaining $220,000 ($250,000-$30,000=$220,000) to Class 2.

5) The system polls the market and determines that the market price of the five-year Treasury notes used to collateralize the transaction is 100% or $12 million. The Class 2 Investor would have to pay $12 million less the $220,000 or $11,780,000. The system posts on the Class 2 screen that $12 million of five year securities are available at a current yield of 7.45% and a worst case yield of 4.08%. The 7.45% yield is the internal rate of return if $11,780,000 is spent today and the investor receives $420,000 interest every six months for five years and a final payment of $12 million in five years. The 4.08% yield is the internal rate of return if $11,780,000 is spent today and the investor receives $220,000 every six months for five years (the remaining $200,000 has gone to Class 1) and $12 million at the end of five years. The market value of Class 2 is $11,780,000. The price of Class 2 is 98.17% ($11,780,000/$12,000,000=98.17%). We can also see the impact of the size of Class 2 on the initial yield. At a Class 2 size of $8,000,000, the arbitrage profit to the underwriter becomes $20,000 ($8,000,000*0.25%=$20,000). This amount is subtracted from the $250,000 paid by the Class 1 investor and leaves $230,000 for purchase of the Treasury notes. The price to the Class 2 investor is $7,770,000 ($8,000,000−$230,000=$7,770,000). The price to the Class 2 investor is 97.13% ($7,770,000/$8,000,000=97.13%). A five-year 7% coupon note purchased at a price of 97.13% produces an internal rate of return of 7.70%.

6) A Class 2 investor sees the quote and agrees to buy $12 million but at a current yield of 7.55%, or higher. This information is transmitted to the underwriter's system. Assume that the market price of the Treasury collateral is still 100% of par (or $12,000,000).

7) The system converts the 7.55% yield for Class 2 into a market price of Class 2 at $11,730,000. The value of $11,730,000 is obtained by finding the initial payment amount that will produce an internal rate of return of 7.55%. The $11,730,000 implies a price of 97.75% ($11,730,000/$12,000,000=97.75%). A 7% five-year note purchased at a price of 97.75% produces an internal rate of return of 7.55%. Since the cost of the required Treasury collateral is $12,000,000, Class 1 must pay $270,000 ($12,000,000−$11,730,000=$270,000). However, since the underwriter wants a 0.25% arbitrage profit, Class 1 must pay $300,000. Of this amount, the underwriter would receive $30,000 and $270,000 would go to Class 2. The $300,000 price is translated into a price of 7.50% of par ($300,000/$4,000,000=7.50%).

8) The system now posts on the Class 1 screen that $4 million are bid at 6.50% (the price the original Class 1 investor wants to pay) while $4 million are offered at 7.50% (the price based on what the Class 2 investor wants). On the Class 2 Screen, the system shows that $12 million are offered at a yield of 7.45% (the price based on the original Class 1 quote of 6.50% of par) while $12 million are bid at a yield of 7.55% (the yield demanded by the Class 2 investor)

9) A Class 1 Investor agrees to pay price of 7.50% of par for $4 million. This information is transmitted to the underwriter's system.

10) The system sees that $4 million of Class 1 securities can be sold along with $12 million of the Class 2 securities, based on current customer quotes. The system immediately clears $12 million of Class 2 and the $4 million of Class 1 signals the underwriter of the transaction. The underwriter buys $12 million Treasury notes at par.

11) The underwriter can continue with the offering of additional securities or can terminate the offering.

12) The Class 1 investor has obtained a prepayment cap that has cash flows guaranteed by the United States government. The Class 1 investor does not have to worry about the creditworthiness of the Class 2 investor. In fact, the Class 1 investor does not even know the identity of the Class 2 investor.

FIGS. 8A-8I illustrate exemplary records/fields that comprise the structure and investor databases 220, 223 in accordance with the above example.

As can be readily seen by the foregoing example, the present invention structures a multi-class instrument transaction such that (i) credit risk of a counterparty is eliminated, (ii) the underwriter bears minimal price risk in the transaction and (iii) the underwriter executes an order to purchases securities only after investors for the respective classes have been identified and have committed to the transaction.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method, implemented in and across an electronic network, for offering a multi-class instrument, comprising the steps of:

storing, within a first computer operated by an underwriter, an initial offer price and an initial offer amount related to at least two classes of the multi-class instrument, the at least two classes being different from each other and separately saleable;

displaying, on at least one second computer, the offer price and offer amount of one of the classes;

receiving, at the first computer, at least one bid in response to the initial offer price and offer amount on the at least second computer;

modifying, in the first computer, an initial offer price and an initial offer amount of another of the classes of the multi-class instrument based on the bid received in response to the initial offer price and offer amount of said one of the classes on the at least one second computer, and displaying on at least a third computer the initial offer price and offer amount of the said another of the classes of the multi-class instrument, accepting the bid received in response to the initial offer price and offer amount on the at least one second computer; and indicating to the underwriter an amount of underlying collateral needed to underwrite the bid received in response to the initial offer price and offer amount on the at least one second computer and the initial offer price and offer amount of the said another of the classes of the multi-class instrument, wherein the underlying collateral has a form different from either of the at least two classes, and wherein the underlying collateral is used to collateralized both of the at least two classes.

2. The method of claim 1, wherein the collateral includes at least one of a treasury note, an agency note, a corporate security, and a contract traded on an organized commodities or securities exchange.

3. The method of claim 1, further comprising the step of matching the bid received in response to the initial offer price and offer amount on the at least one second computer with stored prices and amounts.

4. A method, implemented in and across an electronic network, for offering a multi-class instrument, comprising the steps of:

displaying, on a remote computer, offer information for at least one class of the multi-class instrument, at least two classes being different from each other and separately saleable;

receiving, at an underwriter's computer, a first bid for the one of the classes of the multi-class instrument and comparing the first bid to the offer information;

modifying, at the underwriter's computer, the offer information with respect to another one of the classes of the multi-class instrument based on the first bid for said one of the classes;

displaying, on the remote computer, modified offer information with respect to the said another one of the classes;

receiving, at the underwriter's computer, a second bid for the said another one of the classes;

accepting the first and second bids; and determining an amount of underlying collateral for the underwriter needed to underwrite the first and second bids, wherein the underlying collateral has a form different from either of the one and the said another classes and, wherein the underlying collateral is used to collateralize both of the one and said another classes.

5. The method of claim 4, wherein the multi-class instrument is at least one of a collateralized mortgage obligations (CMO), collateralized bond obligation (CBO), collateralized loan obligations (CLO), stripped mortgage backed security (SMBS), indexed currency option note (ICON), broad indexed structured trust offering (BISTRO), indexed amortizing notes (IAN), range floater, credit linked note, and contract traded on an organized commodities or securities exchange.

6. The method of claim 4, wherein the collateral includes at least one of treasury notes and agency notes.

7. The method of claim 4, further comprising modifying the offer information in view of prevailing market conditions.

8. A method for offering a multi-class instrument, comprising the steps of:

(a) storing, in a system operated by an underwriter, data representative of each class of the multi-class instrument, at least two classes of the multi-class instrument being different from each other and separately saleable;

(b) displaying at least a portion of the data at a first remote location;

(c) receiving, from the first remote location, a bid for at least one of the classes of the multi-class instrument;

(d) modifying, in the system operated by the underwriter, initial offer information for another one of the classes of the multi-class instrument in view of the bid for said one of the classes;

(e) displaying the initial offer information for the said another one of the classes of the multi-class instrument at a second remote location; and (f) receiving, from the second remote location, a bid for the said another one of the classes of the multi-class instrument, wherein the at least two classes of the multi-class instrument are collateralized by the same underlying collateral, and wherein the underlying collateral is in a form different from each of the at least two classes.

9. The method of claim 8, further comprising purchasing the underlying collateral.

10. The method of claim 8, wherein at least part of the collateral of the multi-class instrument includes at least one of treasury or agency notes, and a contract traded on an organized commodities or securities exchange.

11. The method of claim 8, wherein at least steps (a)-(e) are completed within a predetermined period of time.

12. The method of claim 11, wherein the predetermined period of time is about 1 to 240 minutes.

\* \* \* \* \*